United States Patent [19]

Vyas

[11] Patent Number: 4,471,038
[45] Date of Patent: Sep. 11, 1984

[54] NICKEL-CADMIUM BATTERY

[75] Inventor: Brijesh Vyas, New Providence, N.J.

[73] Assignee: AT&T Bell Laboratories, Murray Hill, N.J.

[21] Appl. No.: 557,615

[22] Filed: Dec. 2, 1983

[51] Int. Cl.³ .......................................... H01M 6/16
[52] U.S. Cl. .................................. 429/198; 429/212; 429/213; 429/222; 429/223
[58] Field of Search ..................... 429/198, 212–213, 429/222, 223

[56] References Cited

U.S. PATENT DOCUMENTS

| | | | |
|---|---|---|---|
| 3,060,255 | 10/1962 | Lozier | 429/213 X |
| 3,352,720 | 11/1967 | Wilson et al. | 429/213 |
| 3,573,101 | 3/1971 | Beauchamp | 136/76 |
| 3,653,967 | 4/1972 | Beauchamp | 136/75 |

Primary Examiner—Charles F. Lefevour
Attorney, Agent, or Firm—Walter G. Nilsen

[57] ABSTRACT

The addition of certain polymer compounds such as polybenzimidazole increases the capacity and cycle life of cadmium electrodes in nickel-cadmium batteries.

5 Claims, 2 Drawing Figures

NICKEL-CADMIUM BATTERY

TECHNICAL FIELD

The invention involves a nickel-cadmium cell useful as a power source.

BACKGROUND OF THE INVENTION

Alkaline batteries are of considerable importance as a source of energy. Their long shelf life, high efficiency, long cycle life, and reasonable charge and discharge rates make them highly desirable for many applications. Little or no maintenance is required which for many applications is highly desirable. For example, alkaline batteries are often used as a source of power in remote outdoor locations. Among alkaline batteries the nickel-cadmium battery is particularly noteworthy because of its exceptionally good performance.

In order to increase the energy density of such cells, it is desirable to increase as much as possible the percent utilization of the cadmium electrode. Such increase in utilization would increase the capacity of the cadmium electrode with no increase in weight or permit equal capacity with less cadmium. Because most nickel-cadmium cells are positive electrode limited (the cadmium negative electrode has excess capacity), actual increase in the capacity of the cell requires increase in the capacity of the nickel electrode.

Also, it is desirable to improve the cycle performance of the cadmium electrode. This would ensure higher capacity over long periods of battery use and longer battery lifetimes. Better cycle performance of the cadmium electrode would permit increased capacity of the nickel electrode since less excess capacity of the cadmium electrode would be needed to ensure that the battery is positive electrode limited throughout the life of the battery.

SUMMARY OF THE INVENTION

The invention is an alkaline battery comprising cadmium negative electrode in which the electrolyte comprises polybenzimidazole or related substances. The related substances are similarly structured compounds with sulfur or oxygen substituted for one of the nitrogen atoms (polybenzothiazole and polybenzoxazole) or aliphatic substitutions (up to 5 carbon atoms) for the hydrogen atoms in the above compounds. In other ways, the batteries are conventional. The batteries are composed of cadmium negative electrode, positive electrode such as a nickel electrode and electrolyte. The electrolyte is an alkaline aqueous solution. The alkaline agent is usually an inorganic base such as an alkali-metal hydroxide (e.g., KOH). The concentration of alkali-metal hydroxide is usually high, usually between 20 weight percent and saturation with approximately 30 weight percent most preferred. Such alkaline cells have exceptionally good performance particularly as to energy density and cycle performance.

DETAILED DESCRIPTION

To facilitate an understanding of the invention, the structural formula for polybenzimidazole is given below:

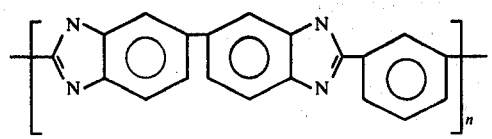

A more proper name for polybenzimidazole is poly 2,2'-(n-phenylene)-5,5'-bibenzimidazole. It is generally made by the melt condensation of 3,3' diaminobenzidine with diphenylisophthalate in a two-step process.

The invention in its broadest terms is based on the observation that the incorporation of small amounts of certain polymer compounds (e.g., polybenzimidazole, polybenzothiazole and polybenzoxazole) increases the percent utilization of the cadmium electrode in an alkaline cell or battery. Incorporation of the polymer may be by any means that assures contact of the dissolved polymer with the cadmium electrode during operation of the battery. Typical procedures for incorporating the polymer are addition to the electrolyte, battery container or separator material as well as addition to the cadmium electrode itself. Generally, addition to the electrolyte or battery container of sufficient polymer to make a saturated solution (about 100 parts per million by weight) is most convenient but smaller amounts, down to about one part per million by weight, are still effective.

The improved characteristics of the cadmium electrode are not strongly dependent on the exact characteristics of the polymer added. For example, the molecular weight may vary over large limits. Typically, the molecular weight distribution is from $10^3$ to $10^6$ (i.e., 80 weight percent of the polymer has a molecular weight between $10^3$ and $10^6$). Most common is a molecular weight distribution between $5 \times 10^4$ and $10^6$ with a peak at approximately $2 \times 10^5$.

In other respects, the alkaline battery or cell is conventional. Indeed, the invention is applicable to a large variety of alkaline batteries containing cadmium electrodes especially nickel-cadmium batteries which are extensively recharged. The particular structure of the nickel-cadmium battery is not critical. The invention is applicable to round, rolled electrodes as well as flat plates and to semi-dry electrolytes (the liquid electrolyte absorbed on an inert material) as well as flooded cells.

Figure 1:
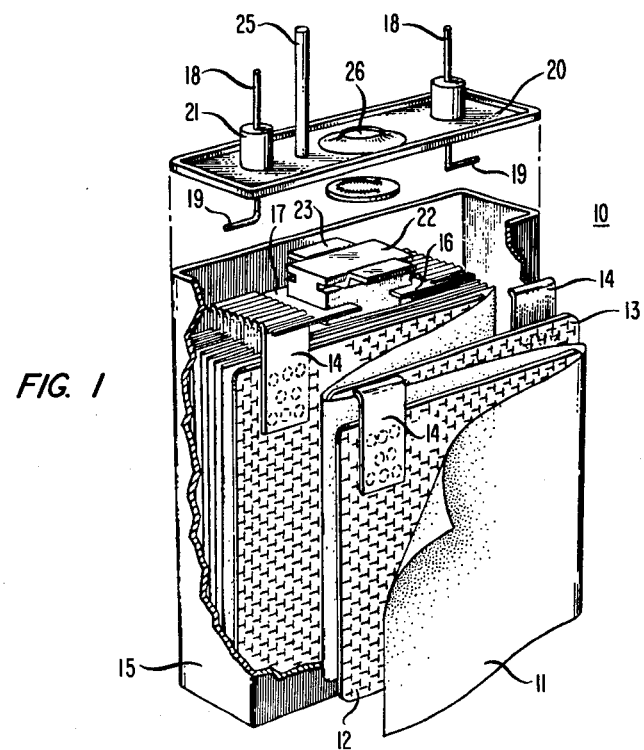
FIG. 1 shows a nickel-cadmium battery useful in the practice of the invention.

To illustrate the invention, a typical nickel-cadmium cell is described. FIG. 1 shows a partially assembled sealed nickel-cadmium battery 10. The battery is made up of a separator 11 and a negative electrode 12 which is impregnated with cadmium. Also shown is a positive electrode 13 impregnated with nickel together with metal tabs 14 and outer battery container 15. The metal tabs are connected together by a core structure having negative 16 and positive 17 electrodes. An electrical connection is made to battery posts 18 by means of metal strip 19. The metal posts are connected to the cover plate 20 by means of a compression seal 21.

A variety of procedures may be used to impregnate the positive and negative electrodes. Generally, chemical impregnation is used. In this process, an electrode structure such as a nickel plaque is soaked in a chemical containing the active material or a precursor to the active material. Other impregnation procedures involve electrolytic loading of electrode structures as described in detail in U.S. Pat. No. 3,573,101 issued to R. L. Beauchamp on Mar. 30, 1971 and U.S. Pat. No. 3,653,967 issued to R. L. Beauchamp on Apr. 4, 1972.

Extensive tests were carried out to show the benefits of the cell made in accordance with the invention. In particular, comparison tests were carried out to show the improved capacity of the cell made in accordance with the invention compared to conventional cells. Nickel-cadmium cells were used in these tests and the capacity of the nickel electrodes was much greater than cadmium electrodes so that capacity was limited by the cadmium electrode.

In a typical experiment, two kinds of cells were used; a conventional cell with electrolyte made up of 30 weight percent reagent grade KOH and a cell made in accordance with the invention with the electrolyte the same as in the conventional cell but saturated with polybenzimidazole.

The electrodes were cycled in flooded cells containing the two electrolytes described above, at constant charge/discharge current at R.T. (~22 degrees C.) by an automatic cycling apparatus with low voltage limits. The working electrode (the cadmium electrode) was placed in the center of the cell and two auxiliary electrodes (nickel electrodes) were placed equidistant on either side of the center electrode. As stated above, the ratio of working to auxiliary electrode capacity was always less than one so that the electrode under study was always limiting in capacity. For the cadmium electrode, the cycling regime consisted of charge at ~c/10 rate (25 mA) for 16 hours and discharge at ~c/2 rate (125 mA) to 0.4 V. This low rate of cycling was chosen since it is known that a decrease in the charge/discharge rate increases the rate of capacity loss in a Cd electrode. The electrode was completely discharged before the next charge cycle. Full discharge is also known to increase the rate of degradation of the Cd electrode. Therefore, these tests were created to simulate a "worst case" condition.

Figure 2:
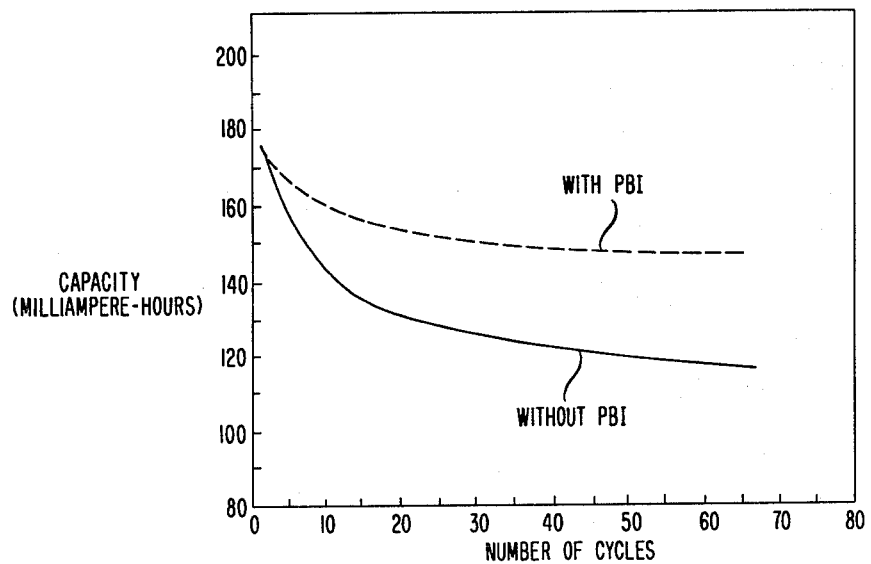
FIG. 2 shows a graph of capacity as a function of the number of cycles for a battery made in accordance with the invention.

The data resulting from these experiments are summarized in FIG. 2. The curve labeled "with PBI" represents the capacity of the cadmium electrode as a function of cycling with the electrolyte solution saturated with polybenzimidazole (PBI); the curve labeled "without PBI" represents the results with a conventional electrolyte without any polybenzimidazole. These data show that the capacity of the cadmium electrode with polybenzimidazoles remains higher on cycling than the same electrode under the same conditions but without added polybenzimidazole. This increased capacity of the cadmium electrode originated from increased utilization of the active material since both cadmium electrodes were identical.

After these tests, the cadmium electrodes were examined under a scanning electron microscope. The surface of the sample with 30 percent KOH solution but no added polybenzimidazole was generally comprised of nodules, probably nickel sinter covered by $Cd(OH)_2$, with crystallographic $Cd(OH)_2$ present in sizes ranging from 1 to 13 $\mu$m. The surface of the samples from the solutions with polybenzimidazole was covered by a large number of small crystals, less than 1 $\mu$m in size. An uncycled chemically deposited Cd electrode consisted of nodules similar to cycled Cd electrodes with pores filled with $Cd(OH)_2$ crystals of 0.5 to 5 $\mu$m. Thus, in the 30 percent KOH solution the $Cd(OH)_2$ crystal size increases with cycling, while in the polybenzimidazole saturated solution the crystal size is decreased. Other investigators have observed crystal growth during flooded cell cycling and in sealed cells after cycling (all containing ~30 percent KOH). The production of such large crystals during cycling has been shown to be the main reason for capacity degradation in Cd electrodes. Although the mechanism for the increased capacity of Cd electrodes exposed to polybenzimidazole is not completely understood, it appears that adding polybenzimidazole tends to decrease the crystal size of the active cadmium species on cycling.

What is claimed is:

1. An alkaline cell comprising nickel positive electrode,
   electrolyte comprising aqueous alkaline solution and negative cadmium electrode characterized in that the alkaline cell further comprises at least one additive selected from the group consisting of polybenzimidazole, polybenzothiazole and polybenzoxazole and derivatives of these compounds with aliphatic substituents with up to 5 carbon atoms.

2. The alkaline cell of claim 1 in which the additive consists essentially of polybenzimidazole.

3. The alkaline cell of claim 2 in which the polybenzimidazole is contained in the electrolyte.

4. The alkaline cell of claim 3 in which the concentration of additive in the electrolyte is between one part per million by weight and saturation.

5. The alkaline cell of claim 1 in which the electrolyte comprises KOH in the concentration range from 20 weight percent to saturation.

* * * * *